Aug. 6, 1957  J. H. REISNER  2,802,111
ELECTRON MICROSCOPE ALIGNMENT DEVICE
Filed May 11, 1955  3 Sheets-Sheet 1

INVENTOR.
John H. Reisner
BY
Morris A. Rabkin
ATTORNEY.

United States Patent Office 2,802,111
Patented Aug. 6, 1957

2,802,111

ELECTRON MICROSCOPE ALIGNMENT DEVICE

John H. Reisner, Haddonfield, N. J., assignor to Radio Corporation of America, a corporation of Delaware Application May 11, 1955, Serial No. 507,665

10 Claims. (Cl. 250—49.5)

The present invention relates to electron microscopes, and more particularly to the alignment of the electron beam with the electron-optical components in the electron microscope.

An electron beam is subject to rotation in passing through a magnetic lens. The amount of rotation is determined by the distance of the electron beam from the axis of the magnetic lens. In an electron microscope, the image of the specimen is projected on the viewing screen by the electron beam. If the electron beam is coincident with the axis of the magnetic lenses in the electron microscope, the projected image rotates about the center of the screen with changes in the strength of the magnetic lenses. However, the projected image goes through gyrations and complex motions on the screen if the electron beam is not in alignment with the axis of the magnetic lenses in the microscope.

Due to practical aspects of the construction of the microscope, the electron beam is not normally in alignment with the axis of the magnetic lenses and other electron-optical components of the microscope. Since tolerances are allowed in the construction of all practical instruments, deviation from an ideal alignment condition can be expected. Furthermore, the axis of a practical magnetic lens may change owing to unsymmetrical hysteresis effects or stray fields.

The electron beam may not coincide with the axis of the magnetic lens and the electron beam also may not be parallel to the axis. Complex motions are seen on the viewing screen in the event that the electron beam is not parallel to the axis of the magnetic lenses. Thus, as an image on the viewing screen is watched while varying the strength of a lens, the image is seen to sweep over the screen. The image may appear to rotate about a false center that is not on the optic axis of the lenses. The illumination on the screen also tends to sweep away from the field of view upon any change in the current to the condenser lens. It is seen, therefore, that means for aligning the electron beam with the axis of the magnetic lenses in the electron microscope is desirable.

Before the present invention, mechanical adjustments were provided to align the electron-optical components with the electron beam. Electron microscopes have been provided with sets of adjusting screws. Some of these screws were used to tilt the electron gun assembly, and thereby tilt the electron beam produced by the gun. Screws were also provided for lateral displacement and tilt of the condenser lens independently, or together with the electron gun. Further adjusting screws for positioning other lenses were provided. The procedure for aligning the microscope involved step-by-step adjustment of these screws while observing the projected image on the viewing screen.

According to the present invention, the alignment of an electron microscope, or other related electron-optical devices, is made possible with a minimum number of mechanical adjustments. The necessary alignment of the electron beam with the axis of the magnetic lens system is accomplished, according to one embodiment of the present invention, by means of two electromagnetic deflection systems. One deflection system is positioned ahead of the condenser lens. This system is located near the electron gun assembly and will be referred to as the gun alignment system for purposes of convenience of description. The other deflection system follows the condenser lens and will be termed the condenser alignment system for purposes of convenience of description. For alignment, the center of the electron beam should be made coincident with the axis of the electron lens following the condenser lens. Ordinarily, the lens following the condenser lens is the objective lens. The gun deflection system causes the electron beam to tilt, if necessary, so that the axis of the beam intersects the axis of the objective lens. The condenser deflection system, thereupon tilts the electron beam so that its axis is coincident with the axis of the objective lens.

Each of the deflection systems can deflect an electron beam in any azimuthal direction around the axis of the system. Therefore, the electron beam axis is reoriented to intersect the axis of the objective lens and to be coincident therewith. Since the axis of the electron beam is aligned with the axis of the electron lens or lenses following the condenser lens, the strength of the objective and succeeding lenses may be altered without causing the center of the projected image to sweep over the screen. The crossover point will move along the axis of post-condenser lens systems as the focal length of the condenser lens is changed.

Provision of electromagnetic deflection systems for alignment permits use of a more rigid, vibration-free, unitary structure for the condenser lens assembly. Fewer vacuum seals are required due to the elimination of mechanical adjustment screws. The improved condenser lens assembly provided by the present invention also permits greater dimensional accuracy in construction and therefore better alignment of mechanical components in the microscope. Furthermore, continuous external magnetic shielding of the condenser assembly may be included.

It is an object of the present invention to provide an improved condenser lens assembly for electron microscopes.

It is another object of the present invention to provide a novel electromagnetic alignment device for electron microscopes and related electron-optical apparatus.

It is a still further object of the present invention to provide a more rigid, shorter, and a more easily evacuable condenser lens assembly in an electron microscope.

It is a still further object of the present invention to provide an improved means, in a condenser lens assembly for an electron microscope, for connecting the vacuum pumping system to the vacuum chamber therein.

It is a still further object of the present invention to eliminate the majority of mechanical adjustments heretofore used in aligning an electron microscope.

Other objects and advantages of the present invention will, of course, become apparent and immediately suggest themselves to those skilled in the art to which the invention is directed from a reading of the following specification in connection with the accompanying drawing in which.

Figure 1:
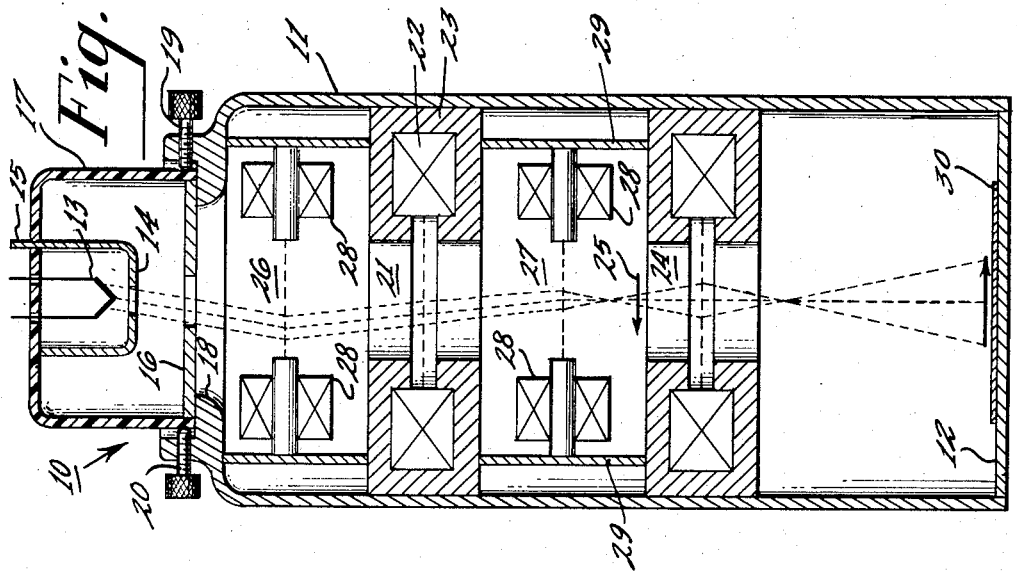
Figure 1 is a schematic representation of an electron microscope embodying one form of the present invention.

Referring to the drawings, one form of the present invention is shown in the figure as being embodied in the schematic representation of an electron microscope. A more detailed presentation of this form of the present invention will be described in connection with Figures 2, 3 and 4.

In Figure 1, an electron gun assembly 10 is positioned on top of the support barrel 11 of the microscope. An end plate 12 is located on the bottom of the support barrel 11. The electron gun assembly 10 is schematically shown as having a filamentary cathode 13. Accelerating potentials may be applied to a terminal 15 of the cathode cap 14. These potentials may be highly negative with respect to ground potential. An anode plate 16, which is maintained at ground potential by conductive contact with grounded portions of the microscope, is positioned below the cathode cap 14. The anode plate 16, the cathode cap 14 and the filament 13 are supported by a shield member 17 constructed from insulating material, and together comprise the electron gun assembly 10. The electron gun assembly 10 rests upon a shoulder 18 formed in the top portion of the barrel 11 of the electron microscope. A vacuum seal (not shown) is arranged around the bottom of the electron gun assembly 10 resting upon the shoulder 18 of the support barrel 11. It is to be understood that the electron microscope is operated with a vacuum established in the chamber through which the electron beam passes.

To provide for lateral adjustment of the electron gun assembly, transversing screws such as screws 19 and 20 are provided. It will be understood that at least three of these screws in circumferentially arranged relationship are required. However, two diametrically opposed screws are shown in the schematic arrangement of Figure 1. The screws 19 and 20 extend through the top portion of the support barrel 11 over the shoulder 18 therein. The electron gun assembly 10 may be made to slide upon the shoulder 18 by rotating the screws 19 and 20.

Supported in the barrel 11 of the electron microscope is a condenser lens 21. This lens is schematically shown as a field coil 22 surrounded by an iron core 23. An objective lens 24 is located below the condenser lens 21 in the support barrel 11. The objective lens 24 is shown as being constructed in a similar manner as the condenser lens 21 for purposes of this schematic presentation. A specimen 25, shown schematically by an arrow, is supported above the objective lens 24.

According to the present invention a deflection coil system 26 is located ahead of the condenser lens 21 in the barrel 11. Another deflection coil system is located following the condenser lens 21. As mentioned before, the deflection coil system 26 ahead of the condenser lens in the gun deflection system, and the deflection coil system following the condenser lens 21 is the condenser deflection system 27. The deflection coil system in Figure 1 includes solenoid type coils 28 which are supported with their axes in a horizontal position by vertical plates 29 of magnetic material. A screen 30, upon which an image of an object is projected, is located on top of the end plate 12.

An understanding of the operation of the above-described form of the present invention may be obtained by referring to Figure 1. An electron beam is produced by the electron gun assembly 10 and is directed downwardly toward the screen 30 on the bottom of the barrel 11 of the electron microscope. The electron beam is represented by three dashed lines. The central dashed line is assumed to be the axis of the beam. The beam may be circular in cross-section. To function properly, the beam must be aligned with the axis of the objective lens 24 before passing through the specimen 25. As viewed in Figure 1, the beam enters the barrel support of the electron microscope at an angle to the axis of the objective lens 24. Heretofore, it was necessary to align the electron beam and all the electron-optical components in the microscope in order to make them coaxial and obtain the proper microscope operating characteristics. This alignment procedure required the use of mechanical adjustments for tilting and laterally adjusting each of the various optical components of the electron microscope. The present invention substantially eliminates the need for mechanical adjustments. The gun deflection system 26 and the condenser deflection system 27 accomplish the required alignment by tilting and displacing the electron beam. To change the amount of beam deflection, the direction and amplitude of current in the various coils contained in each deflection system 26 and 27 are varied.

The electron beam entering the microscope is initially deflected by means of the gun deflection system 26 so that the axis of the beam intersects the axis of the objective lens 26 in the region of the microscope following the condenser lens 21. The condenser deflection system 27 thereupon tilts the electron beam so that the axis of the beam coincides with the axis of the objective lens 24. The condenser lens 21 converges the electron beam so that a crossover point occurs along the objective lens axis preceding the specimen stage 25. As the illumination is varying by changing the focal length of the condenser lens 21, the crossover point moves vertically along the objective lens axis. The axis of the electron beam remains coincident with the objective lens axis. It can be expected that the electron beam will enter the microscope and proceed in a direction that is skewed with respect to the axis of the objective lens 24. The deflection systems 26 and 27 may be constructed, as will be described later herein, so that the electron beam will be deflected along any azimuth with respect to the axis of the objective lens 24.

The electron gun may be displaced in a lateral direction by means of the transversing screws 19 and 20 in the event that electron beam is excessively displaced when it enters the microscope. The deflection systems 26 and 27 operate most efficiently if the electron beam does not enter the gun at an excessive angle or displacement with respect to the objective lens axis.

Figure 2:
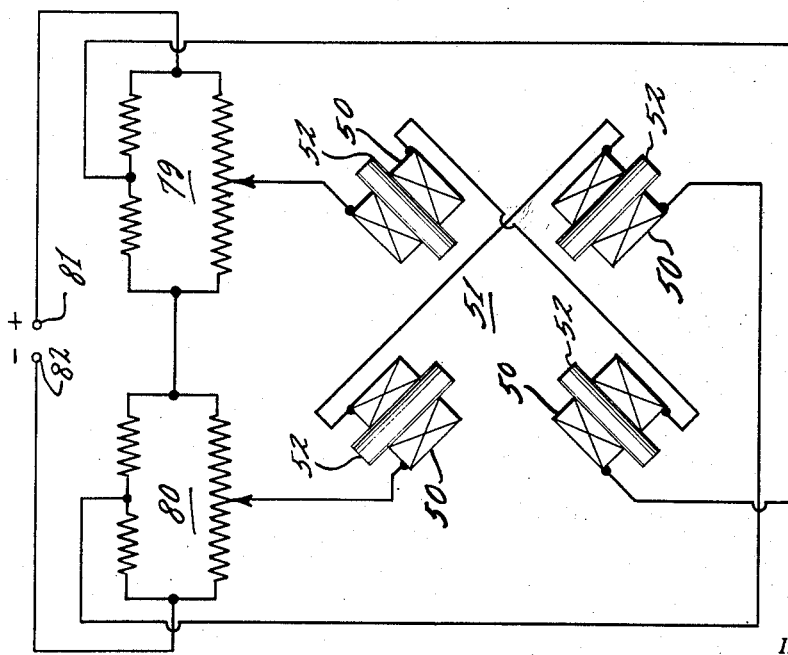
Figure 2 is a circuit diagram illustrating the electrical connection of one of two cooperating gun alignment systems provided by the present invention.
Figure 3:
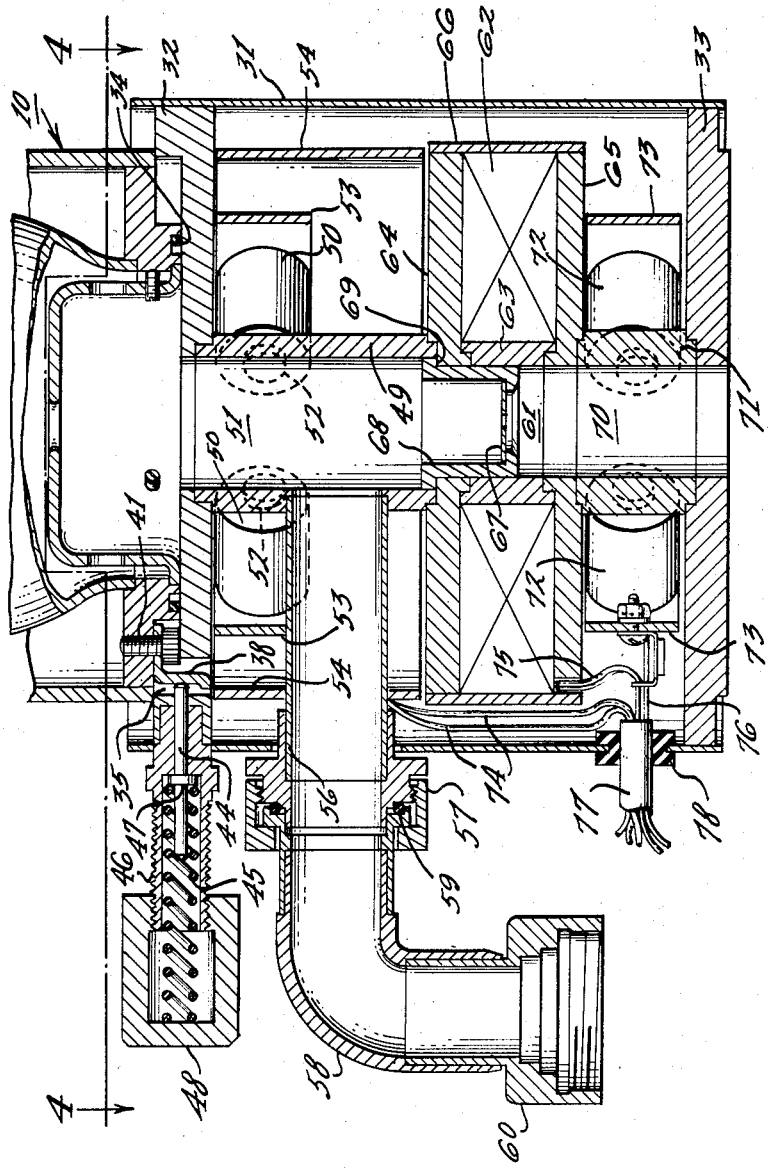
Figure 3 is a view in cross-section, the section being taken on line 3—3 of Fig. 4 as viewed in the directing of the arrows and showing a condenser lens assembly constructed in accordance with the present invention.
Figure 4:
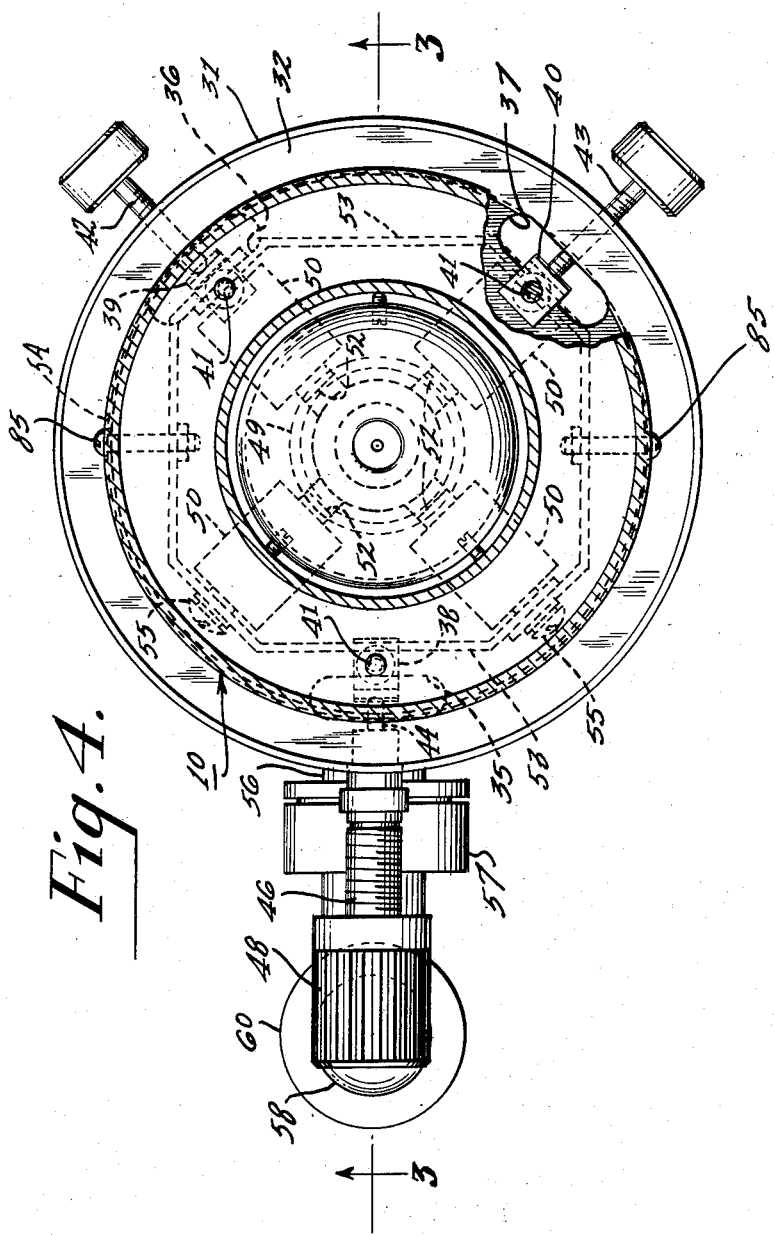
Figure 4 is a cross-sectional view taken along line 4—4 of Figure 3 as viewed in the direction of the arrows.

A more detailed description of a condenser lens assembly constructed according to the present invention will be had with reference to Figures 2, 3 and 4 in which like reference numerals refer to like parts. Figure 3 is a sectional view of a condenser lens assembly. The condenser lens assembly of Figure 3 is contained in a cylindrical supporting barrel 31 constructed of a magnetic material for purposes of shielding the elements contained therein from stray magnetic fields. A top plate 32 and an end plate 33 enclose each end of the barrel 31. The electron gun assembly 10 rests upon the top plate 32. A ring gasket 34 contained in a slot located on the bottom of the electron gun assembly provides an air tight seal between the electron gun assembly 10 and the top plate 32 of the condenser lens assembly.

Three recesses 35, 36 and 37 are provided in the top plate 32. Tabs 38, 39 and 40, which are attached to the underside of the electron gun assembly 10 by means of screws 41, extend into these recesses 35, 36 and 37. Screws 42 and 43 for laterally transversing the electron gun assembly 10 project through the side of the barrel 31 and top plate 32 into the recesses 36 and 37 and engage the tabs 38 and 39. A spring biased plunger 44 extends through the side of the barrel 31 and the top plate 32 opposite to a position midway between the transversing screws 42 and 43. This plunger 44 projects toward one of the tabs 38 placed in one of the recesses 35. A compression spring 45 located within a threaded cylinder 46, which is fixed to the top plate 32 in a horizontal position, engages a shoulder 47 on the plunger 44. The compression of the plunger 44 may be adjusted by changing the lateral position of a knurled knob 48 which screws on to the threaded cylinder 46. The electron gun assembly 10 may be transversed in any direction by adjusting the lateral transversing screws 42 and 43. These screws 42 and 43 vary the forces against the tabs 38, 39 and 40 which are attached to the underside of electron gun assembly 10 and cause the entire electron gun assembly 10 to slide laterally along the top plate 32 of the condenser lens assembly.

An orienting support 49 made of some non-magnetic material, such as brass, is located immediately below the top plate 32 of the condenser lens assembly. Two pairs of deflection coils 50 forming the gun deflection system 51 are held in position by this orienting support 49. It may be observed that the orienting support 49 is concentric with the axis of the condenser lens assembly. Since the magnetic lenses of the electron microscope are concentric with this axis, it is often called the spool axis and the cylindrical members surrounding this axis are called parts of the spool of the electron microscope. The chamber formed by the spool is exhausted and maintained at a high vacuum since the electron beam passes therethrough.

The coils 50 comprising the gun deflection system 51 are of the solenoid type and contain a cylindrical core 52 of magnetic material around which a winding is located. The ends of the cores 52 are located in the cylindrical orienting support 49. The opposite ends of the solenoidal coils 50 are attached to an octagonal member 53 which is constructed of bent strips of magnetic material. Screws 55 that extend through the octagonal member 53 connect it to the solenoidal coils 50. A magnetic circuit containing the coils 50 is completed through this octagonal member 53. A cylindrical magnetic shield 54 constructed of magnetic material surrounds the octagonal member 53 and the gun deflection system 51. The octagonal member 53 is attached to the cylindrical magnetic shield 54 by means of nuts and bolts 85.

It may be observed that the axes of the solenoidal coils 50 lie in a single plane which is perpendicular to the axis of the non-magnetic orienting support member 49. The axis of this cylindrical member 49 is the same as the spool axis of the electron microscope. Furthermore, opposite pairs of the deflection coils 50 are located along transverse diameters of the spool. These diameters intersect the spool axis at the same point since they lie in the same plane. Each diametrical pair of the deflection coils 50 may be connected together in series. An illustrative manner in which the coils 50 may be connected will be described later in connection with Figure 2. The magnitude and direction of the current through each of the coils 50 may be controlled. Since the deflection coils 50 lie in the same transverse plane, the magnetic field established by the gun deflection system 51 will be effectively transverse to the spool axis. An electron beam passing through this transverse magnetic field will be deflected in a direction perpendicular to the spool axis. The electron beam may be deflected in any azimuthal direction with respect to the spool axis by altering the flux distribution between the deflection coils 50. This may be readily accomplished by varying the direction and intensity of the current through the deflection coils 50. The amount to which the beam is deflected will be determined by the intensity of the magnetic field established by the coils 50. The amount of deflection may, therefore, be readily controlled by variations in the intensity of current in the coils 50.

An exhaust pipe 56 extends into an orifice in the side of the orienting cylinder 49 that supports the gun deflection system 51. This exhaust pipe is supported at its inner end by the orienting cylinder 49 and extends through the barrel 31 of the condenser lens assembly. In order to prevent leakage into the vacuum chamber in the electron microscope, the exhaust pipe may be soldered into the orienting support 49. The end of the exhaust pipe 56 extending through the side of the barrel 31 is coupled through a demountable vacuum connector 57 to an elbow pipe 58. The demountable connector contains a gasket ring 59 which prevents leakage through the connector 57. Another connector 60 attached to the elbow section of pipe 58 is provided so that the vacuum pumping system, not shown, of the electron microscope may be coupled to the vacuum chamber.

The condenser lens structure 61 is positioned below the cylindrical support 49 for the gun deflection system 51. The condenser lens 61 is also concentric with the spool axis. A non-magnetic cylindrical spacer 63 is arranged concentric with the spool axis. The field coil 62 of the condenser lens 61 is concentric with this spacer 63. Annular spool ends 64 and 65 of a magnetic material, such as soft iron, are located on the top and bottom of the field coil 62. A cylindrical case 66 of magnetic material encloses the outer surface of the spool ends 64 and 65 and the field coil 62. It may be observed that the outer case 66, which may be of magnetic material, such as soft iron, is substantially contiguous with the cylindrical magnetic shield 54 surrounding the gun deflection system 51 and the orienting support 49 therefor. An auxiliary magnetic shield is therefore provided by means of these contiguous cylinders 54 and 66 of magnetic material. An aperture plate 67 may be inserted along the central horizontal axis of the condenser lens 61. This aperture plate 67 is supported by a flanged cylinder 68 which rests upon a shoulder 69 provided by the upper spool end 64 of the condenser lens 61. The aperture plate 67 and its supporting flanged cylinder 68 are demountable, and may be removed from the vacuum chamber. In addition, demountable pole pieces (not shown) may be inserted in the vacuum chamber around the interior of the condenser lens. However, the condenser lens may be operated successfully without pole pieces under many circumstances.

The purpose of the condenser lens is to converge the electron beam and thereby control the illumination on the specimen. By varying the current through the condenser lens field coil 62, the focal length of the condenser lens 61 changes. The crossover point of the electron beam changes with changes in the focal length. As mentioned heretofore, the specimen may be located transversely with respect to the objective lens axis. If the effective axis of the condenser lens 61 is not coincident with the axis of the objective lens, the crossover point of the electron beam will not remain upon the objective lens axis, but will wander in a complex path thereabout. The illumination of the specimen will not vary directly with variation in the focal length of the condenser lens 61. At some focal lengths, the specimen may not be illuminated. Moreover, if the electron beam is not coincident with the objective lens axis the objective lens and the lenses following the objective lens will cause different parts of the electron beam to undergo different degrees of rotation. As explained before, the image projected by the electron beam on the screen of the microscope will undergo complex gyrations with changes in the strength of any of the magnetic lenses.

The gun deflection system 51 deflects the electron beam so that it intersects the objective lens axis in the region of the vacuum chamber following the condenser lens 61. In order to deflect the electron beam so that its axis is made coincident with the axis of the objective lens system, a condenser deflection system 70 is positioned following the condenser lens 61.

The condenser deflection system 70 is similar to the gun deflection system 51. A cylindrical orienting support of non-metallic material 71, such as brass, is arranged between the lower spool end 65 of the condenser lens 61 and the end plate 33 of the condenser lens assembly. This orienting support 71 is concentric with the spool axis. Two pairs of solenoidal deflection coils 72 are supported and oriented at one end of each coil by the orienting support 71 and at the other ends thereof by an octagonal support 73 of magnetic material similar to the octagonal member 53 supporting the deflection coils 50 in the gun deflection system 51. The axes of the solenoidal coils 72 of the condenser deflection system 70 lie in a plane perpendicular to the spool axis. The deflection coils 72 are also arranged with their axes lying along transverse diameters which intersect the spool axis. It may, therefore, be seen that the arrangement of the condenser deflection system 70 is very similar to the gun deflection system 51. Consequently, the magnetic field produced by the condenser deflection system will be oriented in a direction perpendicular to the spool axis. The electron beam is then deflected in a direction perpendicular to the spool axis. The magnitude and direction of the beam deflection may be controlled in a manner similar to the manner in which the deflection of the beam in the gun deflection system is controlled.

The condenser deflection system 70 and gun deflection system 51 cooperate to effectively re-orient the electron beam. As previously mentioned, the electron beam will be tilted by the gun deflection system so that its axis will intersect the axis of the objective lens system in the region of the vacuum chamber following the condenser lens 61. The condenser deflection system 70 is arranged in the region following the condenser lens 61. Consequently, the condenser deflection system 70 deflects the beam so that its axis coincides with the axis of the objective lens. Since the axis of the electron beam is now coincident with the objective lens axis, the focal length of the condenser lens may be changed without displacing the crossover point of the electron beam from the objective lens axis. The illumination of the specimen may, therefore, be altered in a continuous manner.

Connections to the coils 51 in the gun deflection system may be provided by means of electrical conductors 74. Connection to the condenser lens field coil 62 may also be made by lead-in conductors 75. For connection to the deflection coils 72 in the condenser deflection system 70, other conductors 76 may be employed. All the above-mentioned conductors 74, 75 and 76 are laced together, placed in a sleeve 77 and brought through the barrel 31 of the condenser lens assembly. A grommet 78 is arranged in a hole provided in the side of the barrel 31 for this purpose.

Figure 2 illustrates the circuit of the gun deflection system 51. Because the gun and condenser circuits may be identical in operation, only the gun deflection circuit will be discussed herein. A diametrical pair of deflection coils 50 of the gun deflection system 51 is connected in series across a bridge circuit 79. The other diametrical pair of deflection coils 50 is connected across another bridge circuit 80. The bridge circuits 79 and 80 are substantially identical and are made up of two fixed resistors and a potentiometer. The bridge circuits 79 and 80 are connected in series across a pair of terminals 81 and 82. These terminals are provided for connection to a direct-current power supply and may be polarized as shown upon connection to the supply. When the arms of the potentiometer in the bridge circuits 79 and 80 are in their center position, as viewed in the drawing, there is no potential difference across the pairs of deflection coils 50 and no current flows through them. If the arms of the potentiometers in the bridge circuits 79 and 80 are moved to the left, the arms will assume a negative potential with respect to the opposite side of the bridge circuits 79 and 80 and currents will flow in one direction through the deflection coils 50. On the other hand, movement of the potentiometer arms to the right causes these arms to assume a positive value of potential with respect to the opposite sides of their bridge circuits 79 and 80, and current flows through the deflection coils 50 in an opposite direction. The displacement of the potentiometer arms from their central position determines the amount of current flowing through the deflection coils 50. It may be observed that the direction and magnitude of current through the deflection coils may be adjusted by means of the potentiometers in the bridge circuits 79 and 80. In this way, the gun deflection system 51 may deflect the electron beam, formed by the electron gun, electromagnetically in a direction perpendicular to the spool axis of the electron microscope by the desired amount and in the desired azimuthal direction.

A systematic procedure may be developed whereby, with successive adjustments of the gun transversing screws 42 and 43, the gun deflection controls and the condenser deflection controls, the electron beam may be aligned with the axis of the objective lens. Consequently, an alignment procedure for an electron microscope is provided according to the present invention which simplifies and improves the alignment procedures necessary heretofore. Furthermore, the provision of an electromagnetic alignment system, according to the present invention, permits an improved and more efficient condenser lens assembly construction for an electron microscope.

What is claimed is:

1. In an electron microscope having means for producing an electron beam and means for passing said electron beam through a condenser lens to another lens, means for orienting said electron beam with the axis of said other lens comprising an electromagnetic deflection system positioned in the region of said microscope preceding said condenser lens, and another electromagnetic deflection system positioned in the region of said electron microscope following said condenser lens but preceding said other lens.

2. In an electron microscope in which means are provided for forming an electron beam, an electron lens, means for passing said beam through said lens, means preceding said electron lens for electromagnetically deflecting said beam, and means following said electron lens for electromagnetically deflecting said beam.

3. In an electron microscope having an electron gun including means for forming an electron beam and having a plurality of electron lenses through which said beam successively passes, the combination comprising means for deflecting said electron beam along an azimuth around the axis of a first one of said lenses, said deflecting means positioned in the region of said microscope preceding said lens, and other means for deflecting said electron beam along an azimuth around the axis of a second of said lenses, said other deflecting means positioned in the region following said first lens.

4. A condenser lens assembly for an electron microscope comprising a condenser lens, a first system of deflection coils positioned ahead of said condenser lens, said deflection coils providing a magnetic field in a direction transverse to the axis of said lens, a second system of deflection coils positioned following said condenser lens, and said second system of deflection coils providing a magnetic field in a direction transverse to the axis of said lens.

5. A condenser lens assembly for an electron microscope comprising a cylinder capable of being evacuated through which an electron beam passes, a condenser lens concentric with said cylinder, two pairs of deflection coils positioned above said condenser lens, each pair of deflection coils having its magnetic axis located in a plane transverse to the axis of said cylinder, said magnetic axes of said two pairs of coils intersecting at an angle, and another two pairs of coils positioned below said condenser lens, each pair of said second two pairs of deflection coils having its magnetic axis located in a plane transverse to the cylinder, and said axes of said second two pairs of coils being positioned at an angle with respect to each other.

6. The condenser lens assembly according to claim 5 including electrical means connected to said deflection coils for controlling the magnitude and direction of current through each of said coils.

7. A condenser lens assembly for an electron microscope according to claim 5 including means for connecting said cylinder to a vacuum pumping system comprising an exhaust pipe, an orifice in the wall of said cylinder between said condenser lens and said deflection coils positioned above said lens, said exhaust pipe being positioned in said orifice, and means for providing an air tight connecton between said pipe and said cylinder.

8. A condenser lens assembly for an electron microscope comprising a cylinder capable of being evacuated through which an electron beam passes, a condenser lens concentric with said cylinder, two pairs of deflection coils positioned above said condenser lens and each pair having its magnetic axis located in a plane transverse to the axis of said cylinder, said magnetic axis of one of said pairs of coils being oriented along one of two angularly intersecting diameters of said cylinder, said magnetic axis of said other pair of coils being oriented along the other intersecting diameter of said cylinder, and another two pairs of deflection coils positioned below said condenser lens, said other two pairs of coils having their magnetic axes located in a plane transverse to said axis of said cylinder and angularly intersecting at a point on said cylinder axis.

9. A condenser lens assembly for an electron microscope comprising a support barrel, a spool structure surrounded by said support barrel, a coil concentrically wound around a portion of said spool structure comprising a condenser lens, two pairs of solenoids arranged above said condenser lens with their axes in a plane transverse to the axis of said spool structure, another two pairs of solenoids arranged below said condenser lens with their axes in a plane transverse to said spool structure, each of said pairs of said solenoids being arranged along a diameter of said spool structure, and electrical means connected to said solenoids for controlling the direction and magnitude of current in each of said diametrical pairs.

10. The condenser lens assembly according to claim 8 including a continuous cylindrical shield of magnetic material made up of contiguous sections located outwardly from said condenser lens between said spool structure and said barrel.

References Cited in the file of this patent
UNITED STATES PATENTS

| | | |
|---|---|---|
| 2,233,264 | Marton | Feb. 25, 1941 |
| 2,301,303 | Marton | Nov. 10, 1942 |
| 2,547,994 | Bertein | Apr. 10, 1951 |
| 2,626,358 | Merryman | Jan. 20, 1953 |